April 8, 1969   J. J. HAGOPIAN ET AL   3,437,074
MAGNETIC BRUSH APPARATUS
Filed Dec. 21, 1964

INVENTORS
JACOB J. HAGOPIAN
BY WILLIAM E. STEELE

John H. Holcombe
ATTORNEY.

United States Patent Office 3,437,074
Patented Apr. 8, 1969

3,437,074
MAGNETIC BRUSH APPARATUS
Jacob J. Hagopian and William E. Steele, San Jose, Calif., assignors to International Business Machines Corporation, Armonk, N.Y., a corporation of New York
Filed Dec. 21, 1964, Ser. No. 419,981
Int. Cl. B05c 5/02
U.S. Cl. 118—623
6 Claims

ABSTRACT OF THE DISCLOSURE

A magnetic brush apparatus which includes an endless magnetizable belt which is magnetized by a first magnet uniformly across its width. The belt is moved to cause the magnetic pattern to pass through a batch of ferromagnetic powder. The ferromagnetic powder is attracted to the magnetic pattern and the belt with ferromagnetic powder is then moved adjacent a second magnet which causes a magnetic brush to be formed, while at the same time erasing the magnetic pattern formed by the first magnet.

---

Figures 1, 2:
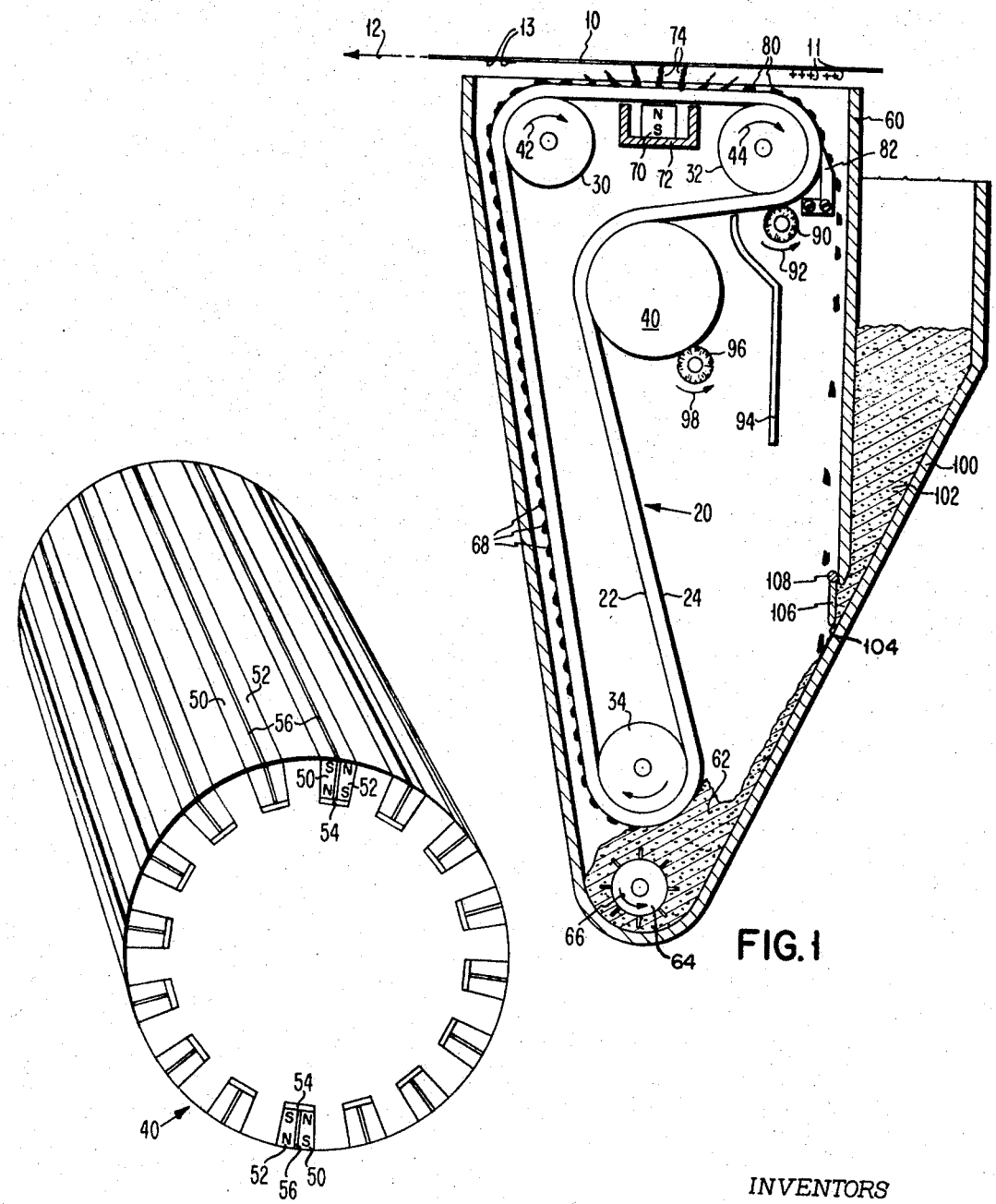

This invention relates to magnetic brush apparatus and, more particularly, to apparatus for forming a magnetic brush and for replenishing and exchanging the particles comprising the magnetic brush.

Magnetic brushes, per se, are well known. When iron filings or granules are placed in the vicinity of a magnetic field, streamers are formed (called "bristles") extending along the magnetic lines of force, constituting a brush-like mass.

An important application of magnetic brushes lies in the field of xerography. In xerography it is usual to form an electrostatic latent image on a surface and to deposit electroscopic particles thereon to develop the image, making it visible. This visible image may be transferred to a second surface and fixed to form a xerographic print or may be fixed directly on the surface having the electrostatic charge.

The magnetic brush is used to develop, or "tone," the electrostatic charge pattern to form a visible image. A finely divided colored material called a toner is intermixed with and deposited on the more coarsely divided iron filings. The toner and iron filings are electrostatically charged with respect to each other by triboelectric charging. The iron filings coated with toner are placed in the vicinity of a magnetic field, forming a magnetic brush, and the brush is placed in contact with a surface bearing the electrostatic image and drawn thereacross. As the brush crosses an area of the image surface having an electrostatic charge, the charge on the surface exerts a greater attraction for the toner than the iron filings, retaining a portion of the toner and separating it from the iron filings.

As portions of the toner are electrostatically withdrawn from the magnetic brush, a smaller amount of toner is available to be attracted to the remainder of the image. In this manner the efficiency of a magnetic brush is reduced as the developing of the electrostatic image progresses unless some means is provided for replenishing the toner or for constantly exchanging the used iron filings for fresh filings fully coated with toner.

It is also important that the height and thickness of the magnetic brush be uniform over the entire width of the electrostatic image so as to uniformly develop the image as it is swept thereacross.

Developments have been made by prior practitioners to accomplish one or the other of the above two objectives, but they have generally been unable to accomplish both satisfactorily.

It is therefore an object of the present invention to provide a magnetic brush toning apparatus which maintains a uniform supply of toner powder therein, so as to offset the consumption of toner powder, and maintains the composition of the magnetic brush uniform across the entire width of the image to be developed.

It is another object of this invention to provide an improved magnetic brush apparatus.

Still another object of this invention is to provide an improved magnetic brush means for applying electroscopic developer powder to an electroscopic image-bearing member.

A feature of the present invention is that it accomplishes the above objects while having a relatively simple and trouble-free configuration.

Briefly, in accordance with the present invention, there is provided magnetic brush apparatus including a magnetizable endless belt, first magnetizing means for magnetizing the magnetizable belt, means for bringing a ferromagnetic powder adjacent the magnetized portion of the belt so that the powder is attracted by the belt, and a second magnetizing means for producing a magnetic flux across the width of the belt, one run of the belt being within the magnetic flux field, the magnetic flux field forming the ferromagnetic powder into a magnetic brush on the one run of the belt.

The foregoing and other objects, features and advantages of the invention will be apparent from the following more particular description of a preferred embodiment of the invention, as illustrated in the accompanying drawings, wherein:

FIG. 1 comprises a side view of a magnetic brush apparatus constructed in accordance with the invention; and FIG. 2 comprises an enlarged perspective view of the cylinder 40 of FIG. 1.

Referring to FIG. 1, there is shown a preferred embodiment of the invention. A plannar medium 10 having an electrostatic latent image 11 recorded thereon is moved in the direction of arrow 12 by conventional means so that the magnetic brush apparatus develops the image by deposition of electroscopic particles 13 in accordance with the electrostatic image. The electroscopic particles may then be heated and fused to the medium 10 by conventional means, or the particles may be transferred to a second medium by conventional means and then fused to the second medium.

The magnetic brush apparatus includes a flexible, magnetizable belt 20, for example comprising a rubber backing 22 and having a uniform magnetic coating 24 on one surface thereof. Alternatively, the belt may be made of a uniform mixture of rubber and evenly distributed magnetic particles. The magnetic belt is mounted as shown around steel spindles 30, 32 and 34 and around cylinder 40, all of which are mounted for rotation in bearings (not shown). The bearings are fixedly mounted so as to prevent lateral movement, and the length of belt 20 is such that it is maintained under constant tension. The belt 20 is wider than the width of electrostatic image 11.

Again alternatively, the backing 22 may be made of a nonelastic material, such as Mylar, and spindle 34 may be spring-loaded so as to maintain the belt under tension. Spindles 30 and 32 are connected to a drive mechanism and a motor (not shown) which drive the spindles in the direction of arrows 42 and 44. These spindles drive the belt 20 due to the frictional force between the spindles and the belt. The belt, in turn, drives spindle 34 and cylinder 40 due to the frictional force between the belt and each of them.

Cylinder 40 is shown in greater detail in FIG. 2. Cylinder 40 is made of solid aluminum having a series of equally spaced, axially extending notches cut in the periphery thereof. Two rectangular, longitudinally extended permanent magnets 50 and 52 are inserted in each notch above steel strips 54 and having brass shims 56 therebetween, all of which extend the full length of cylinder 40. The permanent magnet strips are positioned so as to be alternately poled; that is, the south pole of permanent magnet strip 50 is located along the periphery of cylinder 40, whereas the north pole of permanent magnet strip 52 is located along the periphery of cylinder 40. Steel strips 54 provide a magnetic circuit between the permanent magnet strips. Thus, a magnetic field extends above the surface of brass shims 56 from permanent strip 50 to permanent magnet strip 52. These fields orient the magnetic oxide particles comprising layer 24 upon contact therewith, thereby magnetically recording corresponding areas on the layer.

Referring again to FIG. 1, a container 60 is formed to fit around the magnetic brush apparatus to hold an amount of xerographic toner in a powdered iron carrier 62. A "paddle wheel" mixer 64 is provided and is driven in the direction of arrow 66 by a drive mechanism and motor (not shown) so as to provide a continual mixing action of the carrier and toner.

As the recorded areas of belt 20 come in contact with the mixture 62 of powdered iron carrier and xerographic toner, clumps 68 of the toner and carrier are attracted to the magnetized areas. These clumps extend uniformly across the width of belt 20.

The belt 20 then acts as a conveyor, lifting the clumps 68 to spindle 30.

A large and powerful permanent magnet 70 is mounted on support and magnetic shield 72 directly under belt 20. The shield prevents the magnetic field from extending through steel spindles 30 or 32. Alternatively, the shields may be made of aluminum or other nonmagnetic material having sufficient strength to support the belt against the tension thereon. A permanent magnet 70 extends across at least the entire width of electrostatic image 11 and across almost the entire width of belt 20. The magnetic lines of force extending from permanent magnet 70 cause the formation of "bristles," forming a magnetic brush 74. The magnetic lines of force from permanent magnet 70 are sufficiently strong to orient the powdered iron carrier along the lines of force. Thus, as each clump 68 of powdered iron carrier is delivered to permanent magnet 70, it is caused to "stand up" and become oriented lengthwise along the lines of force, forming bristles. Approximately three sets of bristles are in contact with medium 10 at one time, and each bristle is of uniform consistency across the width of medium 10, thereby providing a uniform development of image 11.

Simultaneously, permanent magnet 70 erases the magnetic recordings on belt 20. Thus, clumps 80 of powdered iron carrier are not attracted to belt 20, but merely ride on the surface thereof. A scraper 82 may be placed in contact with belt 20 so as to scrape most of the powdered iron carrier of clumps 80 from belt 20. In practice, a scraper is not strictly necessary since the powdered iron carrier is not attracted to the belt and will fall off due to the force of gravity. The expended carrier then drops to the bottom of container 60. A cleaning brush 90 is driven in the direction of arrow 92 and cleans any remaining powdered iron carrier from magnetic belt 20. A baffle 94 prevents the attraction of the expended powdered iron carrier to magnetic cylinder 40.

An additional cleaning brush 96 is provided which is rotated in the direction of arrow 98 to clean any extraneous powdered iron carrier from magnetic cylinder 40.

As an alternative, magnetic cylinder 40 may be coated with a thin (about 20 mil) Teflon sleeve, so as to present a smooth surface, and brush 96 then replaced with a scraper similar to scraper 82. It is important that cylinder 40 not slip with respect to belt 20. Thus, if a Teflon sleeve is used, the angle of wrap of belt 20 about cylinder 40 must be sufficient to prevent slippage.

A reservoir 100 is provided for storing pure xerographic toner 102. The reservoir opens into the interior of container 60 through a longitudinal slot 104, which extends the entire width of container 60. A door 106 mounted on shaft 108 is provided for closing slot 104 when the magnetic brush apparatus is not operating. During normal operation of the magnetic brush apparatus, an amount of toner 102, is metered by slot 104, constantly flows into the interior of container 60, mixing with the used iron carrier 80. The mixing is then completed by paddle wheel mixer 64. Thus, the powdered iron carrier is constantly replenished with new toner and made available for reuse.

In operation, permanent magnet 70 erases magnetic domains present in magnetizable coating 24 of belt 20. Permanent magnets 50 and 52 in cylinder 40 record magnetic domains across the entire width of oxide layer 24 as the belt comes into contact with the cylinder. As the belt dips into the mixture 62 of powdered iron carrier and xerographic toner, clumps 68 are attracted to the magnetic domains and are lifted by the belt to spindle 30. As the belt progresses from spindle 30 to spindle 32, the clumps 68 enter the magnetic field of permanent magnet 70. The magnetic field of permanent magnet 70 is of sufficient strength to orient the powdered iron carrier along the magnetic lines of force to form "bristles" of a magnetic brush 74. As the planar medium 10, having an electrostatic latent image 11 recorded thereon, is moved in the direction of arrow 12, portions 13 of the toner are electrostatically withdrawn from the powdered iron carrier. The expended clumps 80 are forced out of the brush 74 by belt 20 and additional clumps 68 are delivered to the magnetic brush. Thus, magnetic brush 74 is continually being refreshed by the replacement of expended powdered iron carrier with fresh carrier coated with xerographic toner.

Since permanent magnet 70 erases the magnetic recordings on belt 20, the clumps 80 of powdered iron carrier are not attracted to belt 20. Instead, clumps 80 merely ride on the surface of belt 20 until they fall from the belt by the force of gravity. These clumps of powdered iron carrier fall to the bottom of container 60 to be mixed with fresh toner 102 by paddle wheel mixer 64.

Thus, it is seen that the present invention provides a magnetic brush toning apparatus which maintins a uniform supply of toner powder within the brush 74, so as to offset the consumption of toner powder, and also which maintains the composition of the magnetic brush 74 uniform across the entire width of the image 11 to be developed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Magnetic brush apparatus for developing an electrostatic latent image carried on a medium, comprising:
   a magnetizable, endless belt;

means for moving said magnetizable belt along a predetermined path;

first magnetizing means for magnetizing said magnetizable belt uniformly across substantially the entire width thereof;

means for bringing a ferromagnetic powder adjacent the magnetized portion of said magnetizable belt so that said powder is attracted by said belt; and second magnetizing means for producing a magnetic flux field across one run of said belt, said magnetic flux field of sufficient strength and of such polarity to erase the magnetization effected on said magnetizable belt by said first magnetizing means and to form said ferromagnetic powder into a magnetic brush which is swept across said electrostatic latent image as said magnetizable belt is moved along said predetermined path.

2. Magnetic brush apparatus, comprising:

a magnetizable web;

means for moving said web along a predetermined path;

first magnetizing means for magnetizing portions of said magnetizable web;

said first magnetizing means comprising a cylinder constructed of nonmagnetic material and having a series of alternately poled, spaced-apart permanent magnets embedded in the surface of said cylinder to a depth such that said magnets extend just to the surface of said cylinder, thereby presenting an essentially smooth surface about the periphery of said cylinder, wherein said cylinder is mounted for rotation about its central axis, and wherein said web is brought into contact with the surface of said cylinder with sufficient frictional force to cause said cylinder to rotate about said axis by said web without slippage therebetween;

means for bringing a ferromagnetic powder adjacent said magnetized web so that said powder is attracted by said web; and second magnetizing means for producing a magnetic flux field extending through said web, thereby forming said ferromagnetic powder into a magnetic brush.

3. The magnetic brush apparatus of claim 2, wherein said first magnetizing means additionally comprises:

a thin, uniform coating of nonmagnetic material about the periphery of said cylinder.

4. In an electrostatic printing apparatus having a first web bearing a latent electrostatic charge image and means for supporting and moving said web along a first predetermined path, developing means for providing a developer applicator magnetic brush which continuously sweeps said web as said web is moved along said first predetermined path, comprising:

a magnetizable web;

means for supporting and moving said magnetizable web along a second predetermined path, one run of which path is parallel to and immediately adjacent said first path traversed by said first web;

first magnetizing means for impressing a magnetic pattern upon said magnetizable web;

means for bringing a ferromagnetic powder adjacent said magnetized pattern of said magnetizable web so that said powder is attracted by said web, said powder triboelectrically holding a quantity of pigmented electroscopic developer powder; and second magnetizing means for producing a magnetic flux field extending through said one run of said magnetizable web and through the portion of said first web adjacent said one run of said magnetizable web, said field being essentially uniform across the entire width of said latent electrostatic image, said magnetic flux field thereby forming said ferromagnetic powder into a magnetic brush on said one run of said magnetizable web, said brush being essentially uniform across the entire width of said electrostatic image and brushing continuously across said latent image on the surface of said first web, whereby developer powder is supplied for attraction to said latent image on said first web.

5. In an electrostatic printing apparatus having a surface bearing a latent electrostatic charge image and means for supporting and moving said surface along a first predetermined path, developing means for providing a developer applicator magnetic brush which continuously sweeps said latent electrostatic charge image as said surface is moved along said predetermined path, comprising:

a magnetizable web;

means for supporting and moving said magnetizable web along a second predetermined path, a portion of which path is parallel to and immediately adjacent said surface;

recording means for recording a magnetic pattern on said magnetizable web;

means for bringing a ferromagnetic powder adjacent said recorded pattern of said web so that said powder is attracted by said pattern, said powder triboelectrically holding a quantity of pigmented electroscopic developer powder; and a magnet structure for producing a magnetic flux field extending through said web and through said surface thereby forming said ferromagnetic powder into a magnetic brush, said brush being of essentially uniform consistency across the entire width of said latent electrostatic charge image and brushing continuously across said latent image on said surface, whereby developer powder is supplied for attraction to said latent image on said surface, said magnetic flux field also erasing said recorded magnetic pattern on said magnetizable web.

6. In an electrostatic printing apparatus having a surface bearing a latent electrostatic charge image and means for supporting and moving said surface along a first predetermined path, developing means for providing a developer applicator magnetic brush which continuously sweeps said latent electrostatic charge image as said surface is moved along said first predetermined path, comprising:

a magnetizable web;

means for supporting and moving said magnetizable web along a second predetermined path, a portion of which path is parallel to and immediately adjacent said first predetermined path;

recording means for recording a magnetic pattern on said magnetizable web;

a reservoir for holding a supply of ferromagnetic powder, said powder triboelectrically holding a quantity of pigmented electroscopic developer powder, and into which said second predetermined path extends, said supply being of sufficient magnitude to contact said web along said second predetermined path so that said powder is attracted and held by said pattern;

a magnet structure situated in proximity to said second predetermined path for producing a magnetic flux field extending through said web and through said surface, thereby forming said ferromagnetic powder into a magnetic brush, said brush being of essentially uniform consistency across the entire width of said latent electrostatic charge image and brushing continuously across said latent image on said surface, whereby developer powder is supplied for attraction to said latent image on said surface, said magnetic flux field also erasing said recorded magnetic pattern on said magnetizable web so that said web ceases to attract said ferromagnetic powder, said second predetermined path being arranged such that said ferromagnetic powder enters said reservoir after said recorded magnetic pattern is erased by said magnetic structure;

means for continuously supplying said pigmented electroscopic developer powder to said reservoir; and means for mixing said ferromagnetic powder and said developer powder in said reservoir, whereby said developer powder becomes triboelectrically attracted to said ferromagnetic powder.

References Cited

UNITED STATES PATENTS

| | | |
|---|---|---|
| 2,258,106 | 10/1941 | Bryce. |
| 2,738,383 | 3/1956 | Herr. |
| 2,786,441 | 3/1957 | Young _____ 95—1.7 |
| 2,832,311 | 4/1958 | Byrne _____ 118—637 |
| 2,910,963 | 11/1959 | Herman _____ 346—74 |
| 3,161,544 | 12/1964 | Berry _____ 118—637 |
| 3,117,065 | 1/1964 | Wootten _____ 118—623 |

BERNARD KONICK, Primary Examiner.

LEE J. SCHROEDER, Assistant Examiner.

U.S. Cl. X.R.

118—637; 198—41; 346—74